United States Patent
Pruet, III

(10) Patent No.: US 8,639,677 B2
(45) Date of Patent: *Jan. 28, 2014

(54) DATABASE REPLICATION TECHNIQUES FOR MAINTAINING ORIGINAL LINEAR REQUEST ORDER FOR ASYNCHRONOUS TRANSACTIONAL EVENTS

(75) Inventor: Clarence Madison Pruet, III, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 848 days.

This patent is subject to a terminal disclaimer.

(21) Appl. No.: 12/102,702

(22) Filed: Apr. 14, 2008

(65) Prior Publication Data

US 2008/0215586 A1 Sep. 4, 2008

Related U.S. Application Data

(63) Continuation of application No. 11/061,071, filed on Feb. 18, 2005, now Pat. No. 7,376,675.

(51) Int. Cl.
*G06F 7/00* (2006.01)
*G06F 17/00* (2006.01)

(52) U.S. Cl.
USPC .......................................... 707/703; 707/704

(58) Field of Classification Search
USPC .................................. 707/703, 704
See application file for complete search history.

(56) References Cited

U.S. PATENT DOCUMENTS

| | | | |
|---|---|---|---|
| 5,170,480 A | 12/1992 | Mohan et al. | |
| 5,381,545 A | 1/1995 | Baker et al. | |
| 5,423,037 A | 6/1995 | Hvasshovd | |
| 5,675,727 A | 10/1997 | Watanabe | |
| 5,684,984 A | 11/1997 | Jones et al. | |
| 5,737,601 A | 4/1998 | Jain et al. | |
| 5,745,753 A * | 4/1998 | Mosher, Jr. | 707/610 |

(Continued)

FOREIGN PATENT DOCUMENTS

| | | |
|---|---|---|
| JP | 07210435 | 8/1995 |
| WO | 03044697 A1 | 5/2003 |

OTHER PUBLICATIONS

IBM Informix Dynamic Server Enterprise Replication Guide, Version 9.4, Mar. 2003, Part No. CT1T2NA, pp. i-ix, pp. 1 to 9-22.

(Continued)

*Primary Examiner* — Apu Mofiz
*Assistant Examiner* — Mohammad Rahman
(74) *Attorney, Agent, or Firm* — Patterson & Sheridan, LLP

(57) ABSTRACT

A system and article of manufacture maintain the original order of a sequence of transactions originating from a source database and being replicated to a target database. A lockable object is associated with each transaction of the sequence of transactions from the source database. Each transaction has one or more transactional events. The transactions of the sequence of transactions have an order. The order is a commit order of the transactions in the source database. The lockable object is based on the commit order. A lock is attempted to be obtained on one or more lockable objects associated with one or more transactions of the sequence of transactions which precede a particular transaction of the sequence of transactions. In response to being unable to obtain the lock, the one or more transactional events of the one or more transactions which precede the particular transaction are serially processed.

14 Claims, 7 Drawing Sheets

(56) References Cited

U.S. PATENT DOCUMENTS

| | | | |
|---|---|---|---|
| 5,781,912 A * | 7/1998 | Demers et al. | 1/1 |
| 5,799,306 A | 8/1998 | Sun et al. | |
| 5,806,075 A | 9/1998 | Jain et al. | |
| 5,884,327 A | 3/1999 | Cotner et al. | |
| 5,884,328 A | 3/1999 | Mosher, Jr. | |
| 5,926,819 A | 7/1999 | Doo et al. | |
| 5,937,415 A | 8/1999 | Sheffield et al. | |
| 6,058,401 A | 5/2000 | Stamos et al. | |
| 6,061,769 A | 5/2000 | Kapulka et al. | |
| 6,119,130 A | 9/2000 | Nguyen et al. | |
| 6,122,630 A | 9/2000 | Strickler et al. | |
| 6,216,136 B1 | 4/2001 | Ronström | |
| 6,216,137 B1 | 4/2001 | Nguyen et al. | |
| 6,351,795 B1 | 2/2002 | Hagersten | |
| 6,363,387 B1 | 3/2002 | Ponnekanti et al. | |
| 6,377,959 B1 | 4/2002 | Carlson | |
| 6,408,163 B1 | 6/2002 | Fik | |
| 6,421,686 B1 | 7/2002 | Martin, Jr. | |
| 6,460,052 B1 | 10/2002 | Thomas et al. | |
| 6,507,880 B1 | 1/2003 | Arimilli et al. | |
| 6,510,421 B1 * | 1/2003 | Ganesh et al. | 1/1 |
| 6,529,917 B1 | 3/2003 | Zoltan | |
| 6,529,932 B1 | 3/2003 | Dadiomov et al. | |
| 6,532,479 B2 | 3/2003 | Souder et al. | |
| 6,553,442 B1 | 4/2003 | Arimilli et al. | |
| 6,584,477 B1 | 6/2003 | Mosher, Jr. | |
| 6,587,856 B1 | 7/2003 | Srinivasan et al. | |
| 6,615,223 B1 * | 9/2003 | Shih et al. | 707/625 |
| 6,668,260 B2 | 12/2003 | Zoltan | |
| 6,681,226 B2 | 1/2004 | Bretl et al. | |
| 6,721,765 B2 | 4/2004 | Ghosh et al. | |
| 6,732,122 B2 | 5/2004 | Zoltan | |
| 6,738,971 B2 | 5/2004 | Chandrasekaran et al. | |
| 6,748,374 B1 | 6/2004 | Madan et al. | |
| 6,877,016 B1 | 4/2005 | Hart et al. | |
| 6,915,287 B1 | 7/2005 | Felsted et al. | |
| 6,983,277 B2 | 1/2006 | Yamaguchi et al. | |
| 7,003,531 B2 * | 2/2006 | Holenstein et al. | 1/1 |
| 7,162,689 B2 | 1/2007 | Demers et al. | |
| 7,200,620 B2 | 4/2007 | Gupta | |
| 7,200,624 B2 | 4/2007 | He et al. | |
| 7,376,675 B2 | 5/2008 | Pruet, III | |
| 2001/0007103 A1 | 7/2001 | Breiter et al. | |
| 2002/0007363 A1 | 1/2002 | Vaitzblit | |
| 2002/0016793 A1 | 2/2002 | Keith, Jr. | |
| 2002/0065999 A1 | 5/2002 | Kikuchi et al. | |
| 2002/0078231 A1 | 6/2002 | Chang et al. | |
| 2002/0087586 A1 | 7/2002 | Yamagishi | |
| 2002/0091716 A1 | 7/2002 | Yokouchi | |
| 2002/0099726 A1 | 7/2002 | Crudele et al. | |
| 2002/0099728 A1 | 7/2002 | Lees et al. | |
| 2002/0169788 A1 | 11/2002 | Lee et al. | |
| 2002/0174142 A1 | 11/2002 | Demers et al. | |
| 2002/0198899 A1 | 12/2002 | Yamaguchi et al. | |
| 2003/0046342 A1 | 3/2003 | Felt et al. | |
| 2003/0149709 A1 | 8/2003 | Banks | |
| 2003/0154238 A1 | 8/2003 | Murphy et al. | |
| 2003/0158868 A1 | 8/2003 | Zoltan | |
| 2003/0182309 A1 | 9/2003 | Ernst et al. | |
| 2003/0208511 A1 | 11/2003 | Earl et al. | |
| 2003/0212789 A1 | 11/2003 | Hamel et al. | |
| 2003/0225760 A1 | 12/2003 | Ruuth et al. | |
| 2003/0236786 A1 | 12/2003 | Shi et al. | |
| 2004/0006563 A1 | 1/2004 | Zwiegincew et al. | |
| 2004/0025079 A1 | 2/2004 | Srinivasan et al. | |
| 2004/0030703 A1 | 2/2004 | Bourbonnais et al. | |
| 2004/0078379 A1 | 4/2004 | Hinshaw et al. | |
| 2004/0103342 A1 | 5/2004 | Moser et al. | |
| 2004/0133591 A1 | 7/2004 | Holenstein et al. | |
| 2004/0158588 A1 | 8/2004 | Pruet, III | |
| 2004/0205066 A1 | 10/2004 | Bhattacharjee et al. | |
| 2005/0021567 A1 | 1/2005 | Holenstein et al. | |
| 2005/0125423 A1 | 6/2005 | Chou et al. | |
| 2005/0165818 A1 | 7/2005 | Cole et al. | |
| 2005/0193024 A1 | 9/2005 | Beyer et al. | |
| 2005/0193035 A1 | 9/2005 | Byrne | |
| 2005/0193040 A1 | 9/2005 | Adiba et al. | |
| 2005/0193041 A1 | 9/2005 | Bourbonnais et al. | |
| 2005/0278394 A1 * | 12/2005 | Oks et al. | 707/202 |
| 2006/0031811 A1 | 2/2006 | Ernst et al. | |
| 2006/0047713 A1 | 3/2006 | Gornshtein et al. | |
| 2006/0190497 A1 | 8/2006 | Inturi et al. | |
| 2006/0190498 A1 | 8/2006 | Pruet, III | |
| 2006/0190503 A1 | 8/2006 | Naicken et al. | |
| 2007/0226218 A1 | 9/2007 | Chatterjee et al. | |
| 2008/0059469 A1 | 3/2008 | Pruet | |
| 2012/0005160 A1 | 1/2012 | Naicken et al. | |

OTHER PUBLICATIONS

IBM Informix Dynamic Server Enterprise Replication Guide, Version 9.4, Mar. 2003, Part No. CT1T2NA, pp. i-ii, pp. Appendix A-1 to G-4, Index pp. 1-18.

Dominic J. Delmolino, "Strategies and Techniques for Using Oracle7 Replication: Part 1", Archives, Oracle Magazine Interactive, Methodology [online], May/Jun. 1995, [retrieved on: Jul. 16, 2004] Retrieved from the Internet: <URL: http://arthemis.na.astro.it/oracle/oramag/archives/55METH.html>. 11 pages.

Fabio A.M. Porto et al. "Persistent Object Synchronization with Active Relational Databases", IEEE/ACM AN-6364906, pp. 53-62; Technology of Object-Oriented Languages and Systems, Aug. 1-5, 1999, Santa Barbara, California, IEEE Computer Society.

T.N. Vijaykumar et al, "Transient-Fault Recovery Using Simultaneous Multithreading," Proceedings of the 29th Annual International Symposium on Computer Architecture (ISCA '02), 1063-6897/02, copyright 2002 IEEE, IEEE Computer Society, 12 pages.

IBM Technical Disclosure Bulletin, "Referential Integrity Implementation Details and Advantages," Mar. 1995, pp. 477-488, [online] [retrieved on: Jun. 4, 2004] Retrieved from the Internet: <URL: https//www.delphion.com/tdbs/tdb?o=95A%2060598>. 6 pages.

Cuenca-Acuna et al., "Autonomous Replication for High Availability in Unstructured P2P Systems", Proceedings of the 22nd International Symposium on Reliable Distributed Systems (SRDS'03), 2003, 10 pages.

Ghandeharizadeh et al., "Placement of Continuous Media in Wireless Peer-to-Peer Networks," IEEE Transactions on Multimedia, vol. 6, No. 2, Apr. 2004, pp. 335-342.

Joshi et al., "ShadowObjects: A Programming Model for Service Replication in Distributed Object Systems," Journal of Parallel and Distributed Computing, vol. 59, No. 1, Oct. 1999. 16 pages.

"Technique for Replicating Distributed Directory Information", May 1991, IBM Technical Disclosure Bulletin, pp. 113-120, [online] [retrieved on Jun. 4, 2004] Retrieved from the Internet<URL: https://www.delphion.com/tdbs/tdb?o=91A%/2061241>. 6 pages.

"Informix Guide to SQL Syntax, Chapter 1: SQL Statements, ALTER TABLE," [online] copyright 1998, Informix Software, Inc., [Retrieved on Jan. 17, 2005]. Retrieved from the Internet: <URL: http://www-306.ibm.com/software/data/informix/pubs/library/datablade/dbdk/sqls/01alter.fm1.html>. 22 pages.

Al-Karmi et al., IBM Technical Disclosure Bulletin, "Type Modification in Object Oriented database Using Exception Handling," IBMTDBS#AAA93A063495, v36n12 Dec. 1993, pp. 579-580. [online] Dec. 1993 [Retrieved on Aug. 30, 2004] Retrieved from the Internet: <URL: https://www.delphion.com/tdbs/tdb?order=93A+63495>. 2 pages.

Teresa K. Ge, Wayne W. Lee, Brenda M. Lam, United States Patent Application titled "Differential Management of Database Schema Changes," Filed Dec. 17, 2004, Assigned to International Business Machines Corporation, IBM Docket No. CA9200400048US1. 23 pages.

Office Action for U.S. Appl. No. 11/061,071 mailed on Jun. 22, 2007 <10 pages>.

Examiner Interview Summary for U.S. Appl. No. 11/061,071 mailed on Sep. 13, 2007 <2 pages>.

Amendment for U.S. Appl. 11/061,071, filed on Oct. 22, 2007 <28 pages>.

Notice of Allowance for U.S. Appl. No. 11/061,071 mailed on Jan. 14, 2008 <11 pages>.

(56) References Cited

OTHER PUBLICATIONS

312 Amendment for U.S. Appl. No. 11/061,071, filed on Feb. 7, 2008 <8 pages>.

Joseph Silva et al., "An Algorithm to Compare OO-Conceptual Schemas," 18th IEEE International Conference on Software Maintenance (ICSM'02), Oct. 2002: pp. 351-358.

Rocco De Nicola et al., "A modal logic for mobile agents," Journal of ACM Transactions on Computational Logic (TOCL), Jan. 2004, vol. 5(1): pp. 1-53.

Barbara Staudt Lerner, "A model for compound type changes encountered in schema evolution," Journal of ACM Transactions on Database Systems (TODS), Mar. 2000, vol. 25(1): pp. 83-127.

Baowen Xu et al., "Parallel Genetic Algorithms with Schema Migration," 26th Annual International Computer Software and Applications Conference, Aug. 2002: pp. 879-886.

T. M. Wittenburg et al., "An Adaptive Document Management System for Shared Multimedia Data," IEEE International Conference on Multimedia Computing and Systems, 1994: pp. 245-254.

Office Action History of U.S. Appl. No. 11/061,071 from Jun. 22, 2007 to Apr. 30, 2008.

Office Action History of U.S. Appl. No. 11/061,072 from May 16, 2007 to May 17, 2011.

Office Action History of U.S. Appl. No. 11/060,986 from Jun. 21, 2007 to Apr. 6, 2011.

Office Action History of U.S. Appl. No. 11/060,924 from May 30, 2007 to Jun. 10, 2011.

Office Action History of U.S. Appl. No. 11/469,257 from Feb. 12, 2009 to Sep. 25, 2009.

Office Action History of U.S. Appl. No. 11/016,228 from Mar. 7, 2007 to Oct. 19, 2009.

\* cited by examiner

DATABASE REPLICATION TECHNIQUES FOR MAINTAINING ORIGINAL LINEAR REQUEST ORDER FOR ASYNCHRONOUS TRANSACTIONAL EVENTS

CROSS REFERENCE TO RELATED APPLICATIONS

This application is a continuation of prior application Ser. No. 11/061,071, filed Feb. 18, 2005. Application Ser. No. 11/061,071 is hereby incorporated by reference in its entirety.

Co-pending U.S. application Ser. No. 11/061,072 entitled "Replication-Only Triggers," filed concurrently herewith, by Clarence Madison Pruet III, assigned to the assignee of the present invention, is incorporated herein by reference in its entirety.

Co-pending U.S. application Ser. No. 11/060,986 entitled "Support for Schema Evolution in a Multi-Node Peer-to-Peer Replication Environment," filed concurrently herewith, by Nagaraju Inturi and Clarence Madison Pruet III, assigned to the assignee of the present invention, is incorporated herein by reference in its entirety.

Co-pending U.S. application Ser. No. 11/060,924 entitled "Online Repair of a Replicated Table," filed concurrently herewith, by Rajesh Govind Naicken, Clarence Madison Pruet III, and Konduru Israel Rajakumar, assigned to the assignee of the present invention, is incorporated herein by reference in its entirety.

BACKGROUND OF THE INVENTION 1.0 Field of the Invention

This invention relates to a database management system; and in particular, this invention relates to replicating data in a database management system.

2.0 Description of the Related Art

Database management systems allow large volumes of data to be stored and accessed efficiently and conveniently in a computer system. In a database management system, data is stored in database tables which organize the data into rows and columns. FIG. 1 depicts an exemplary database table 20 which has rows 22 and columns 24. To more quickly access the data in a database table, an index may be generated based on one or more specified columns of the database table. In a relational database management system, specified columns are used to associate tables with each other.

The database management system responds to user commands to store and access the data. The commands are typically Structured Query Language statements such as SELECT, INSERT, UPDATE and DELETE, to select, insert, update and delete, respectively, the data in the rows and columns. The SQL statements typically conform to a SQL standard as published by the American National Standards Institute (ANSI) or the International Standards Organization (ISO).

Departments within an enterprise may have their own database management systems, typically at different sites. An enterprise typically wants to share data throughout the enterprise. A technique called replication is used to share data among multiple database management systems.

A replication system manages multiple copies of data at one or more sites, which allows the data to be shared. Data may be replicated synchronously or asynchronously. In synchronous data replication, a two-phase commit technique is used. In a two-phase commit, a transaction is applied only if all interconnected distributed sites agree to accept the transaction. Typically it is preferable for all hardware components and networks in the replication system to be available at all times in for synchronous replication.

Asynchronous data replication allows data to be replicated, at least on a limited basis, and thus allows for system and network failures. In one type of asynchronous replication system, referred to as primary-target, all database changes originate at the primary database and are replicated to the target databases. In another type of replication system, referred to as update-anywhere, updates to each database are applied at all other databases of the replication system.

An insert, update or delete to the tables of a database is a transactional event. A transaction comprises one or more transactional events that are treated as a unit. A commit is another type of transactional event which indicates the end of a transaction and causes the database to be changed in accordance with any inserts, updates or deletes associated with the transaction.

In some database management systems, a log writer updates a log as transactional events occur. Each transactional event is associated with an entry in the log. Each entry in the log is associated with a value representing a log position.

When a replication system is used, a user typically specifies the types of transactional events which cause data to be replicated. In addition, the user typically specifies the data which will be replicated, such as certain columns or an entire row of a table. In some embodiments, the log writer of the database management system marks certain transactional events for replication in accordance with the specified types of transactional events. The replication system reads the log, retrieves the marked transactional events, and transmits the transactional events to one or more specified target servers. The target server applies the transactional events to the replicated table(s) on the target server.

Typically, there are many events in a database management system that are processed asynchronously which also need to adhere to order. In replication processing, since transactional events are usually posted in parallel by multiple users of the database, it is difficult to maintain the linear order of the posting of the events without processing the events serially.

Therefore, there is a need for a technique to maintain order. In addition, the technique should also maintain order while allowing events to be processed, if possible, in parallel.

SUMMARY OF THE INVENTION

To overcome the limitations in the prior art described above, and to overcome other limitations that will become apparent upon reading and understanding the present specification, various embodiments of a system and an article of manufacture maintain the order of a sequence of transactions originating from a source database and being replicated to a target database are provided. The system and article of manufacture include receiving, from said source database, a first transaction and a second transaction. Here, said first transaction was committed prior to said second transaction at said source database. The system and article of manufacture also include processing said first transaction using a first thread. A first lockable object is locked once processing of said first transaction begins, and is unlocked once said first transaction is committed. Additionally, the system and article of manufacture include, prior to committing said second transaction at said target database, determining whether said first thread has committed said first transaction, based on whether a lock on said first lockable object can be obtained. In response to determining that said first thread has not been committed said first transaction, the system and article of manufacture include serially processing said first transaction and said second transaction using said first thread, whereby said second transaction is committed after said first transaction at said target database. Furthermore, in response to determining that said first thread has committed said first transaction, the system and article of manufacture include processing said second transaction using a second thread that is distinct from said first thread.

In this way, a technique to maintain order is provided. The technique also maintains order while allowing transactional events to be processed, if possible, in parallel.

BRIEF DESCRIPTION OF THE DRAWINGS

The teachings of the present invention can be readily understood by considering the following description in conjunction with the accompanying drawings, in which.

To facilitate understanding, identical reference numerals have been used, where possible, to designate identical elements that are common to some of the figures.

DETAILED DESCRIPTION

Figure 1:
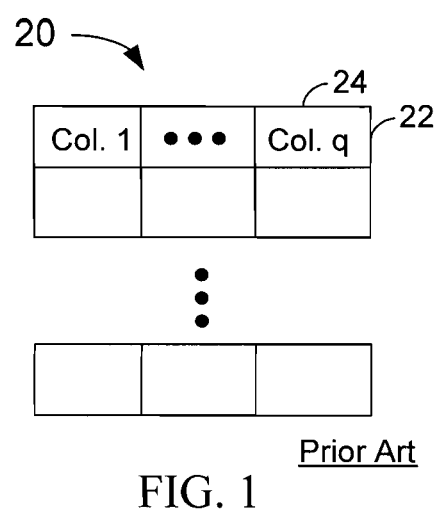
FIG. 1 depicts a block diagram of an illustrative table of a database management system.

After considering the following description, those skilled in the art will clearly realize that the teachings of the various embodiments of the present invention can be utilized to replicate data in a database management system. A method, system and article of manufacture maintain the original order of a sequence of transactions originating from a source database and being replicated to a target database. A lockable object is associated with each transaction of the sequence of transactions from the source database. Each transaction has one or more transactional events. The transactions of the sequence of transactions have an order. The order is a commit order of the transactions in the source database. The lockable object is based on the commit order. A lock is attempted to be obtained on one or more lockable objects associated with one or more transactions of the sequence of transactions which precede a particular transaction of the sequence of transactions. In response to being unable to obtain the lock, the one or more transactional events of the one or more transactions which precede the particular transaction are serially processed.

A database server is a software application which implements a database management system. A replication server is a database server that participates in data replication. Multiple database servers can execute on the same physical server computer, and each database server can participate in replication.

In replication, changes to one or more tables of a database on a source replication server are collected, transported and applied to one or more corresponding tables on replication target servers. A replication application implements the replication server functionality.

To replicate data, a user defines a replicate, that is, the user provides a replicate definition. A replicate is associated with one or more replication servers, also referred to as participants, a table to replicate among the participants, and the columns of the table that will be replicated. The replicate is also associated with various attributes which describe how to replicate the data among the participants, such as conflict resolution rules.

The replication server maintains replication information in a replicate definition that comprises one or more tables in the global catalog. The replicate definition comprises information specifying the replicate configuration and environment, information specifying what data is to be replicated, for example, whether to replicate particular columns or an entire row, and information specifying the conditions under which the data should be replicated. The replicate definition also specifies various attributes of the replicate such as a description of how to handle any conflicts during replication.

The replication application creates the global catalog when the replication application is initialized. In embodiments which use the IBM Informix Dynamic Server, the global catalog is called the syscdr database.

Each replication server typically has its own local copy of the global catalog and maintains one or more tables in the global catalog to keep track of replicate definition and state. The global catalog is created when a database server is defined as a replication server. The tables in a global catalog on one replication server are typically automatically replicated to the global catalogs of the other replication servers.

Figure 2:
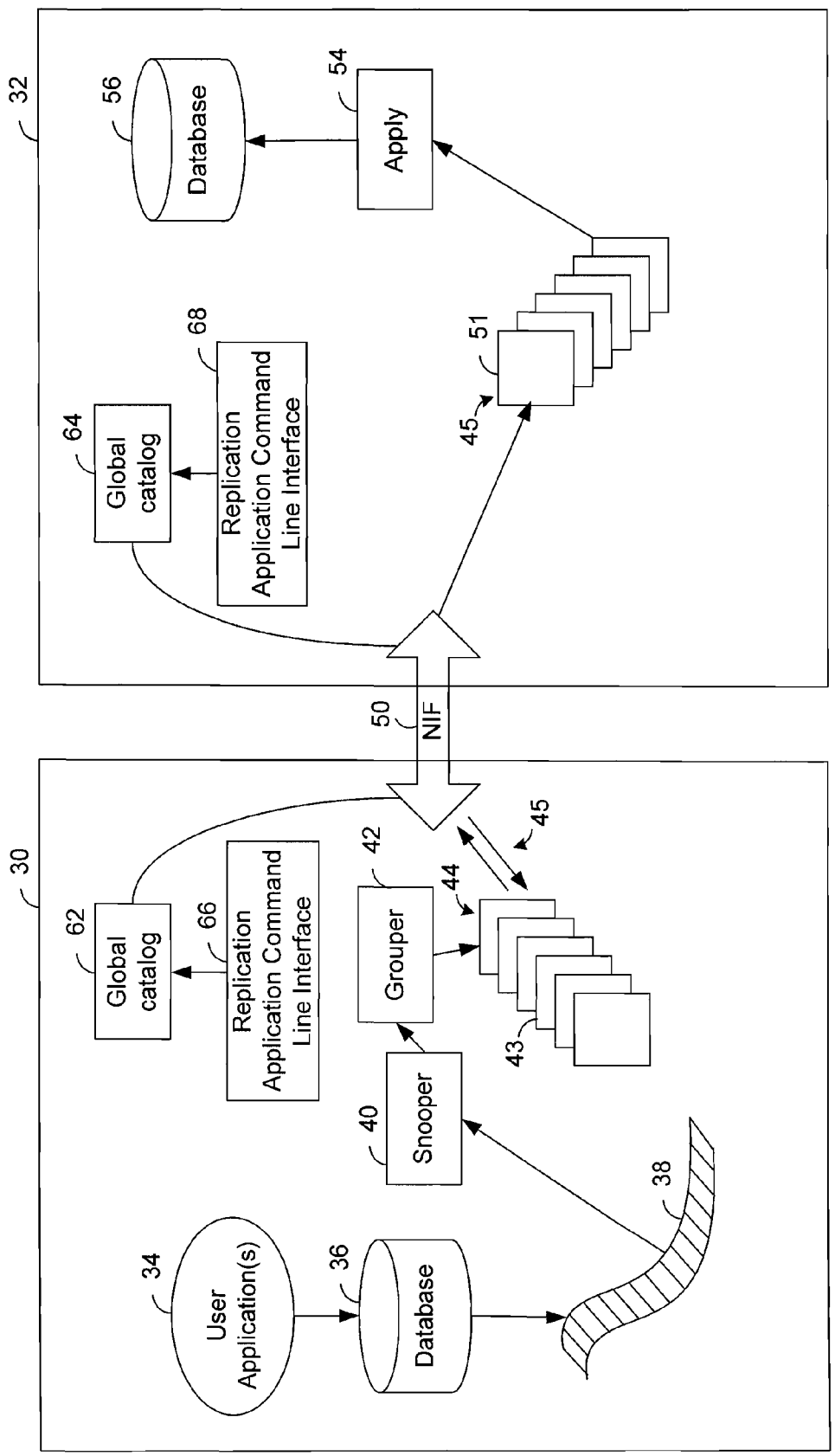
FIG. 2 depicts a diagram of an embodiment of a replication environment suitable for use with the present invention.

FIG. 2 depicts a diagram of an embodiment of a replication environment suitable for use with the present invention. A source replication server 30 and a target replication server 32 are participants, or nodes, in a replicate. The source replication server 30 and the target replication server 32 will be referred to as a source server and a target server. The source server 30 and the target server typically execute on different computer systems. In the source server 30, one or more user applications 34 are accessing and changing the tables of a database 36. The changes to the database 36 are stored in a log 38. The changes are transactional events. The replication application comprises a snooper 40 and a grouper 42. The snooper 40 reads the log 38 and captures various transactional events in accordance with the replicate definition. The grouper 42 assembles the captured changes in accordance with their associated transactions to provide transaction replication data 43 and places the transaction replication data 43 in a queue 44 to send to the target server 32 via the network interface (NIF) 50. Transaction replication data is also referred to as replication data or replicated data. As indicated by arrows 45, the queue 44 can be used to send and receive data. The queue 44 comprises a send queue to send data to the target server 32, and a receive queue to receive data from the target server 32.

In the target server 32, the transaction replication data 51 is received in a queue 52. An apply component 54 retrieves the transaction replication data 51 from the queue 52 and applies the replication data 51 to the appropriate table and column(s) in the database 56. For example, if the transaction replication data comprises an insert operation, the apply component performs the insert operation on a table of the replicate.

The source and target servers, 30 and 32, have global catalogs, 62 and 64, and a replication application command line interface, 66 and 68, respectively. The replication application command line interface 66 and 68 receives commands for the replication application. The replication application command line interface 66 and 68 is also used to update the global catalogs 62 and 64, respectively.

In various embodiments, the replication application on a replication server typically comprises a snooper, grouper and apply component. In this way, data can be replicated both to and from the replication server.

In some embodiments, a computer system executing the replication application comprises multiple central processing units or processors, and various portions of the replication operation are executed concurrently. For example, the apply component may execute on one or more processors and each portion of the apply component that executes on one processor is referred to as an apply thread.

In various embodiments, the transactional events of the log are operation requests. An operation request may be an insert, update or delete operation, or a post commit trigger request. In some embodiments, the log is a linear file.

It is desirable to process some transactions at a target database server in similar order to the original transactions on a source database server. The phrase "linear request order" refers to the processing of transactions, and therefore the transactional events associated with the transactions, in the same order as the original transactions. In various embodiments, the linear request order is the commit order of the transactions.

In various embodiments, linear ordered asynchronous transactional events have one or more common characteristics. One characteristic is that the transactional events of a transaction are not propagated to the other participants until the transaction that entered the transactional event request issues a commit. If the transactional events are propagated before the transaction has committed, it is possible that the transactional event will be performed on a transaction that will rollback. Therefore, the propagation of the transactional event is deferred until the original transaction has committed.

Another characteristic is that the transactional event is ordered by the associated transaction's commit in the log. As a transaction is executed, transactional event requests are placed directly into the log. These transactional event requests may comprise requests for post-commit trigger execution or replication.

Yet another characteristic is that the transactional event is executed only once. For example, the transactional event should not be repeatedly processed in the case of recovery of the database server. In various embodiments, to ensure that the transactional event is processed only once, a record of which specific transactional events have been processed is maintained in persistent storage.

The transactional events will often occur concurrently from multiple users. To continuously process incoming transactional event requests, the multi-user processing of the transactional events is simulated while maintaining the original linear order as defined by transaction commit order of the transactional events.

In various embodiments, transactions, and therefore their transactional events, are processed in parallel by using a commit progress table to record the progress of the processing of the asynchronous events. In some embodiments, the commit progress table is the post-commit progress table of co-pending U.S. application Ser. No. 11/061,072 entitled "Replication-Only Triggers," filed concurrently herewith, by Clarence Madison Pruet III. In various embodiments, the transactional events within a transaction are processed, the commit progress table is updated for the transactional events, and the transaction is committed. The processing of the transactional events can be performed in parallel, but the maintenance of the commit progress table and the commit of the transactions are serialized and are in proper order. The original transactional ordering is re-established as the last step in processing the transactional events.

Figure 3:
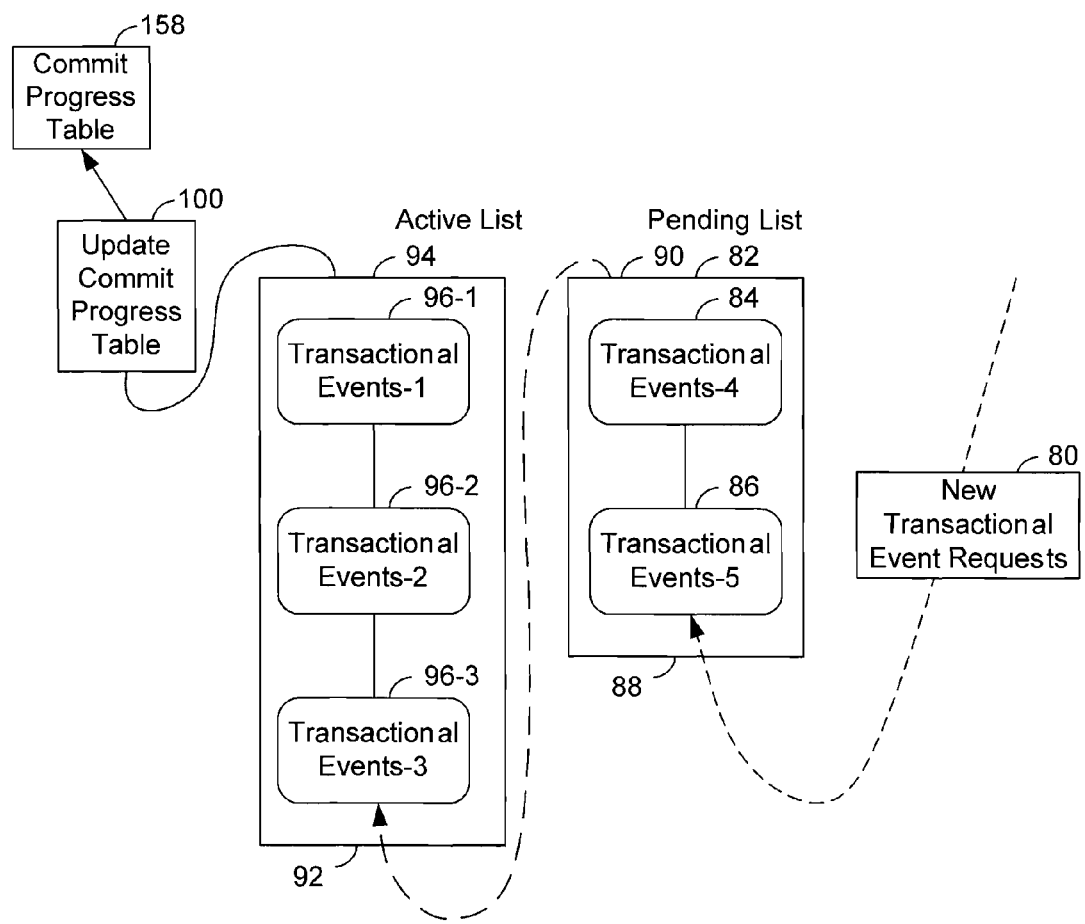
FIG. 3 depicts a diagram of an embodiment of processing transactions, and their associated transactional events, so that the original linear request order of the transactions can be maintained.

FIG. 3 depicts a diagram of an embodiment of the processing of transactions, that is, one or more transactional events of a transaction, which were sent from the source server to the target server. Various embodiments of simulating multi-user activity will be described with reference to FIG. 3 as follows.

New transactions 80, comprising new transactional event requests, are received at the target server. A pending list 82 of transactions 84 and 86 to be processed is maintained. As the transactions are received, the transactions are placed at the tail 88 of the pending list 82. As the transactions are allowed to be processed, the transactions are moved from the head 90 of the pending list 82 to the tail 92 of an active list 94. While on the active list 94, the transactions 96-1, 96-2 and 96-3, are processed in parallel using separate parallel threads. The block 96-1 labeled "Transactional Events-1" comprises one or more transactional events associated with a first transaction. The block 96-2 labeled "Transactional Events-2" comprises one or more transactional events associated with a second transaction. The block 96-3 labeled "Transactional Events-3" comprises one or more transactional events associated with a third transaction. When a processing thread for a transaction is finished, that processing thread waits until the transaction reaches the head of the active list 94. When the transaction reaches at the head of the active list 94, the thread is allowed to update the commit progress table 58 and commit the transactional events of the transaction. Block 300 represents a module that updates the commit progress table 58.

In the technique described above, a thread processing a subsequent transaction may complete its activity prior to a thread processing a previous transaction. In that case, the subsequent transaction's thread waits for the previous transaction to be processed. For example, the transactional events-1 of the first transaction committed first on the source server, the transactional events-2 of the second transaction occurred next on the source server, and the transactional events-3 of the third transaction occurred last. Each thread is executing on a separate processing unit. Suppose that thread-1 is processing transactional events-1, thread-2 is processing transactional events-2, and thread-3 is processing transactional events-3. It is possible that thread-3 could complete prior to thread-1, and thus thread-3 waits for thread-1 to complete.

In another example, suppose that thread-3 is holding a resource that thread-1 also needs to obtain. In this example, a form of a deadly embrace has occurred. This deadly embrace is not a classic deadly embrace which occurs often in a multi-user database when rows and/or pages are locked by various transactions. Rather this deadly embrace is between a commit order of the transactions, and the resources to process the transactional events associated with those transactions.

Typically, a database management system has a lock manager. In various embodiments, as a transactional event, such as an insert, update or delete, is processed, the lock manager locks the row(s) associated with that transactional event. In a classic deadly embrace, the lock manager is used to determine if a row or page is currently available for update. Based on the rows and/or pages being accessed, the lock manager detects if two transactions are in a deadly embrace and will cause at least one of the transactions enter rollback mode to resolve the blockage.

It is desirable to detect a deadly embrace between the commit order of a transaction and a resource. In various embodiments, a resource is simulated by associating the order of a transaction with a lockable object, such as a pseudo-row or alternately a row of a table, which can be locked using the lock manager. Using the lockable object, the lock manager can be used to detect a deadly embrace between the commit order of a transaction and a resource. Various embodiments of the invention will be described with respect to a lockable object that is a pseudo-row; however, in other embodiments, the lockable object is a row of a table rather than a pseudo-row.

The pseudo-row can be obtained by using the commit order as though it were a row identifier. As the transactional events of transaction containing events are placed on the pending list, the transaction is assigned, or associated with, a row identifier, that is, a "rowid," based on the order that that the transactional events of the transaction are placed on the pending list. In some embodiments, the row identifier is a pseudo-rowid. Continuing the above example, Transactional Events-1 of the first transaction is associated with a pseudo-rowid having a value of one. Transactional Events-2 of the second transaction is associated with a pseudo-rowid having a value of two. Transactional Events-3 of the third transaction is associated with a pseudo-rowid having a value of three.

To detect whether a deadly embrace involving the commit order has occurred, the thread which is applying the transactional events of a transaction performs the following. The thread obtains an exclusive lock on the pseudo-rowid associated with the transaction which that thread is executing. The thread processes the transactional events of the transaction. The thread then attempts to obtain shared locks on all of the pseudo-rowids of the transactions preceding the transaction that the thread is processing in the active list. If a shared lock cannot be obtained, a deadly embrace between the commit order and a resource has occurred and the transactional events of preceding transactions in the active list are processed serially. Once the transaction reaches the top of the active list, the thread updates the progress table recording the identity of this transaction that the thread is processing. In some embodiments, the thread stores a timestamp of when the transaction was committed in the progress table. The thread commits the execution of the transactional events associated with the transaction. Since the commit will free all locks held by the transaction, this will also free the exclusive lock on the pseudo-rowid associated with the transaction that the thread is executing. By removing the exclusive lock on the pseudo-rowid, subsequent transactions will be able to obtain a shared lock on the same pseudo-rowid. In this way, the lock manager can be used to detect that a deadly embrace has occurred between the commit order of the transactions and resources held by the threads processing the transactional events of the transactions.

Figure 4A:
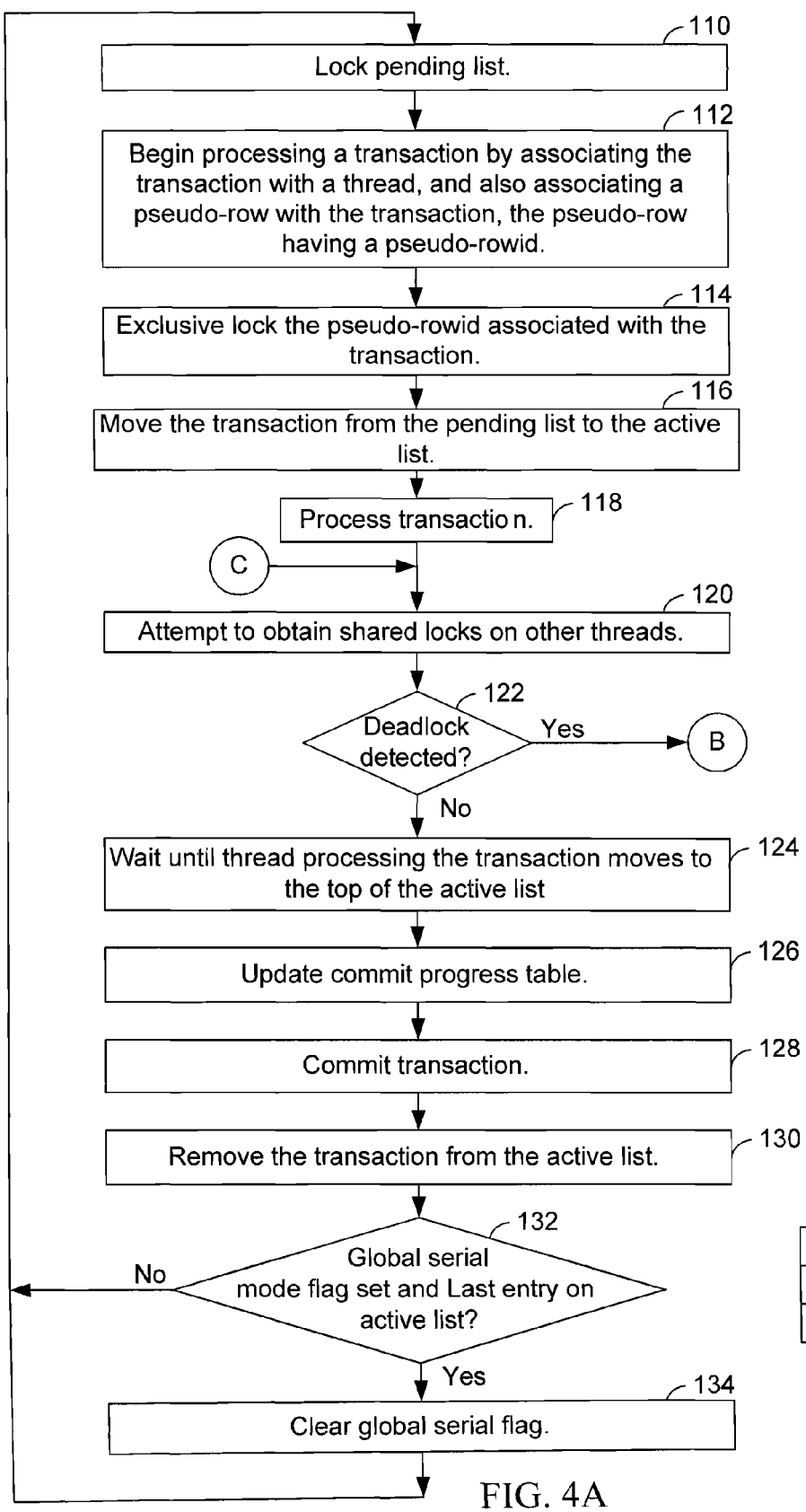
FIG. 4 comprises FIGS. 4A, 4B and 4C which collectively depict a flowchart of an embodiment of processing transactions, and their associated transactional events, so that the original linear request order of the transactions can be maintained.
Figure 4B:
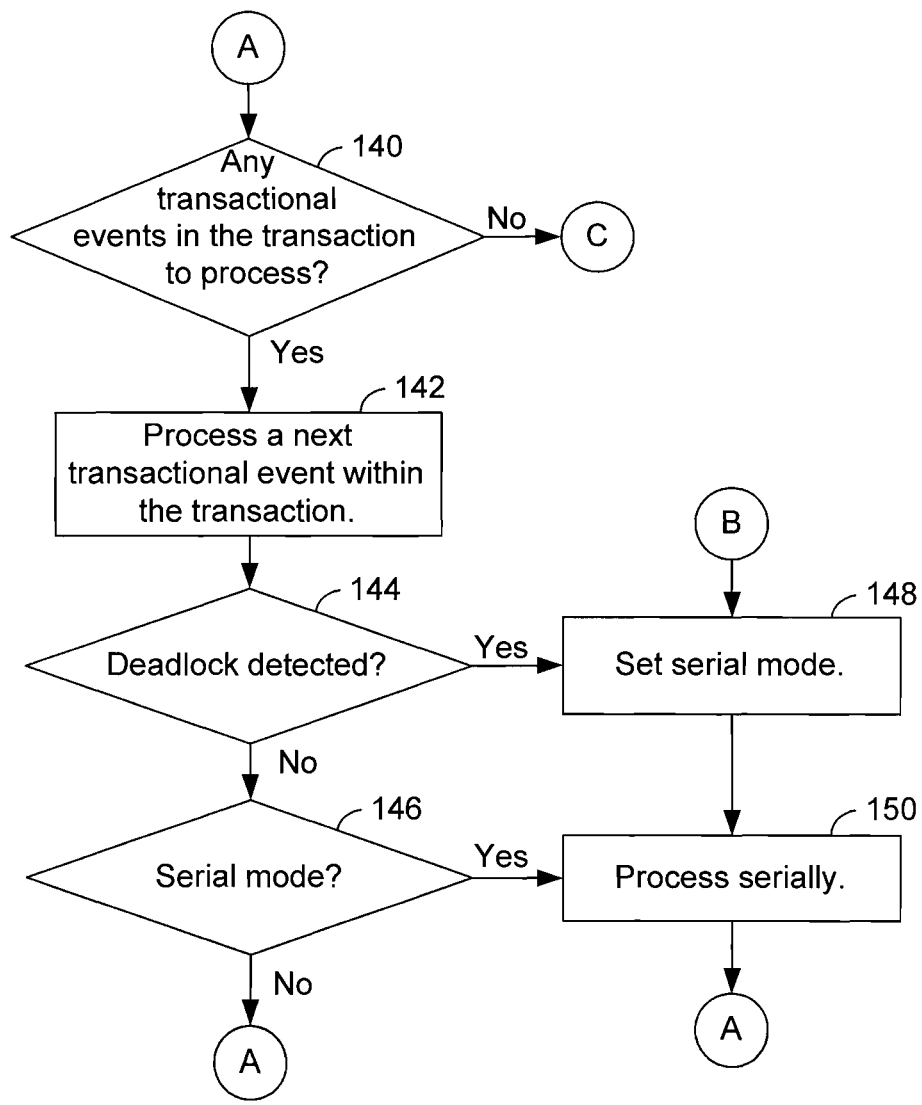
Figure 4C:
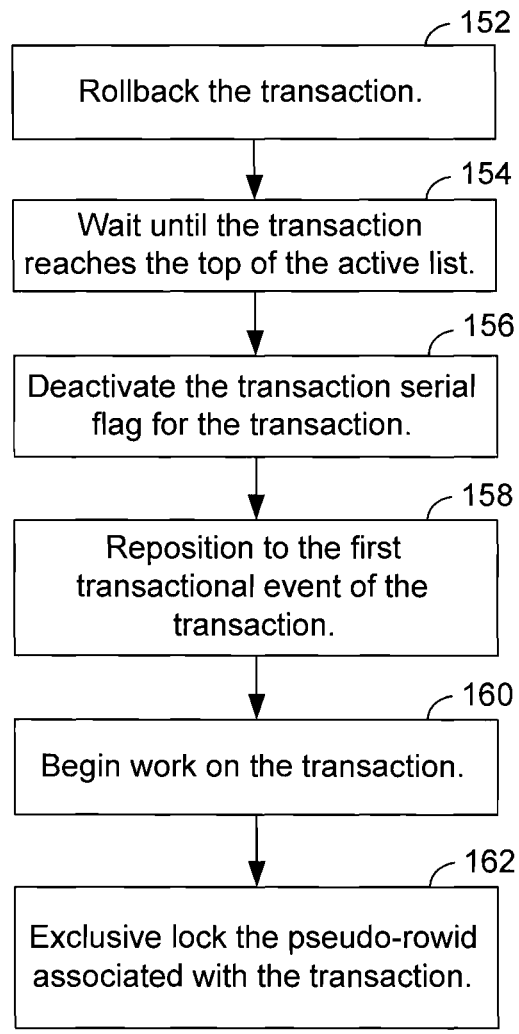

FIG. 4 comprises FIGS. 4A, 4B and 4C which collectively depict a flowchart of an embodiment of processing transactions, and their associated transactional events, so that the original linear request order of the transactions can be maintained. In various embodiments, the flowchart of FIG. 4 is implemented in the apply component of the replication application.

In FIG. 4A, in step 110, the pending list is locked. The pending list is locked when moving a transaction, and the associated transactional events, from the pending list to the active list. In step 112, the processing of the transaction begins by associating the transaction with a thread, and also associating a pseudo-row with a transaction to be moved from the pending list to the active list, the pseudo-row having a pseudo-rowid. The thread processes the transaction. In step 114, the pseudo-rowid associated with the transaction is exclusively locked. In step 116, the transaction is moved from the pending list to the active list.

In step 118, the transaction is processed. In particular, the transactional events of the transaction are processed. After the transactional events associated with a transaction are processed, but prior to committing the transaction and its associated transactional events, in step 120, the thread processing the transaction attempts to obtain shared locks on other threads. In various embodiments, the thread processing the transaction attempts to obtain a shared lock on the respective pseudo-rowids associated with preceding transactions being processed by other threads in the active list.

Step 122 determines whether a deadlock was detected in response to attempting to obtain the shared locks. If at least one shared lock was not obtained, then a deadlock has been detected. If the shared lock(s) were obtained then no deadlock was detected, and in step 124, the thread processing the transaction waits until the transaction moves to the top of the active list. In step 126, the commit progress table is updated. In various embodiments, the commit progress table contains a single row which indicates the log position associated with the commit of the last instruction which was committed on the target database. The commit progress table is updated with a log position of the commit of the transaction. In step 128, the transaction, with its associated transaction events, is committed. In step 130, the transaction is removed from the active list.

Step 132 determines whether a global serial mode flag set and whether the transaction is the last entry on the active list. If so, in step 134, the global serial flag is cleared and proceeds to step 110 to process another transaction on the pending list. At this point, because the global serial mode flag and the transaction serial flags are deactivated, the threads will process the transactional events of the transactions in parallel, that is, concurrently. If step 132 determines that the global serial mode flag is set or that the transaction is not the last entry on the active list, the flowchart proceeds to step 110 to process another transaction on the pending list.

FIG. 4B depicts a flowchart of an embodiment of the process transaction block 118 of FIG. 4A. The process transaction block 118 of FIG. 4A starts at step 140 of FIG. 4B. Step 140 determines whether there are any transactional events of the transaction to process. If not, step 140 returns to via Continuator C to step 120 of FIG. 4A. If step 140 determines that there is at least one transactional event of the transaction to process, in step 142, a next transactional event within the transaction is processed.

Step 144 determines whether a deadlock was detected. If not, step 146 determines whether the transaction serial flag is set for the transaction. If not, step 146 proceeds to step 140 to determine if there are more transactional events in the transaction to process.

In response to step 144 determining that a deadlock was detected, in step 148, serial mode is set. The global serial flag is set to indicate that the transactions in the active list, and their associated transactional events, should be processed serially. In addition, each transaction in the active list is also associated with a transaction serial flag, and the transaction serial flag associated with the transactions in the active list is set to serial mode. In step 150, the transactions in the active list are processed serially, and step 150 proceeds to step 140 to determine if there are more transactional events of the transaction to process.

In response to step 122 of FIG. 4A determining that a deadlock was detected, step 122 proceeds via Continuator B to step 148 of FIG. 4B to set serial mode and process transactions serially. The thread sets a global serial flag and also sets a transaction serial flag is set, that is activated, for each preceding transaction to the transaction being processed by the thread. The transactional events of the transactions for which a transaction serial flag is set, that is, activated, will be processed serially.

FIG. 4C depicts a flowchart of an embodiment of block 150 of FIG. 4B which performs serial processing. In step 152, the transaction is rolled back. Step 354 waits until the transaction reaches the top of the active list. In step 156, the transaction serial flag associated with the transaction is deactivated. The transaction serial flag for the transaction is turned off to avoid re-entering serial mode for that transaction. Step 158 repositions to the first transactional event of the transaction. Step 160 begins working on the transaction. Step 162 exclusively locks the pseudo-row id associated with the transaction.

Figure 5:
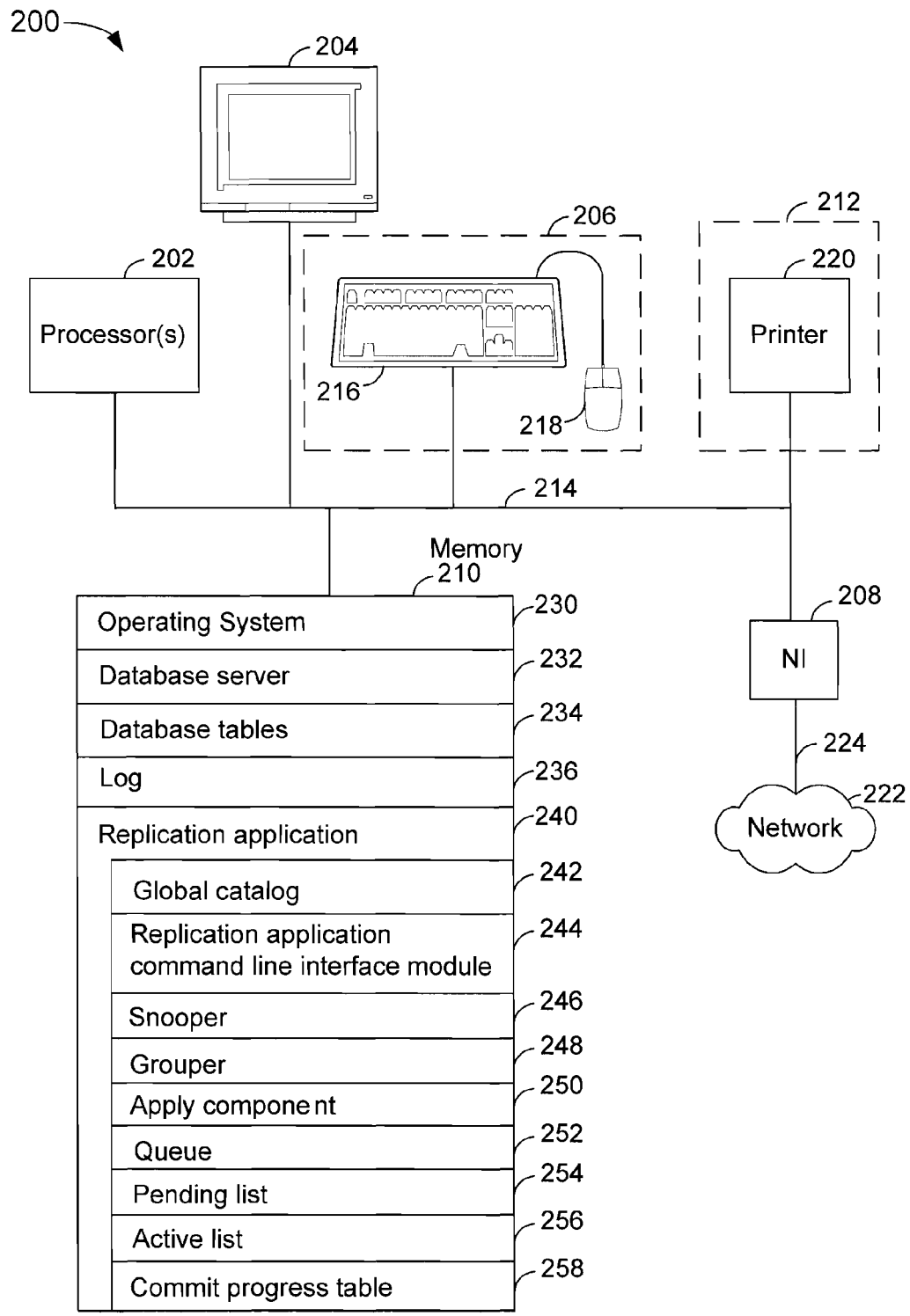
FIG. 5 depicts an embodiment of an illustrative computer system which uses various embodiments of the present invention.

FIG. 5 depicts an embodiment of an illustrative computer system which uses various embodiments of the present invention. The computer system 200 comprises processor(s) 202, display 204, input interfaces (I/F) 206, communications interface 208, memory 210 and output interface(s) 212, all conventionally coupled by one or more buses 214. The input interfaces 206 comprise a keyboard 216 and a mouse 218. The output interface 212 comprises a printer 220. The communications interface 208 is a network interface (NI) that allows the computer 200 to communicate via a network 222. The communications interface 208 may be coupled to the network 222 via a transmission medium 224 such as a network transmission line, for example twisted pair, coaxial cable or fiber optic cable. In another embodiment, the communications interface 208 provides a wireless interface, that is, the communications interface 208 uses a wireless transmission medium.

The memory 210 generally comprises different modalities, illustratively semiconductor memory, such as random access memory (RAM), and disk drives. In various embodiments, the memory 210 stores an operating system 230, a database server 232, database tables 234, a log 236, and a replication application 240. In various embodiments the replication application 240 comprises a global catalog 242, a replication application command line interface module 244, a snooper 246, a grouper 248, an apply component 250, a queue 252, a pending list 254, an active list 256 and a commit progress table 258.

In various embodiments, the specific software instructions, data structures and data that implement various embodiments of the present invention are typically incorporated in the replication application 240. Generally, an embodiment of the present invention is tangibly embodied in a computer-readable medium, for example, the memory 210, and is comprised of instructions which, when executed by the processor 202, cause the computer system 200 to utilize the present invention. The memory 210 may store the software instructions, data structures and data for any of the operating system 230, a database server 232, database tables 234, a log 236, and a replication application 240 in semiconductor memory, in disk memory, or a combination thereof. Other computer memory devices presently known or that become known in the future, or combination thereof, may be used for memory 210.

The operating system 230 may be implemented by any conventional operating system such as AIX® (Registered Trademark of International Business Machines Corporation), UNIX® (UNIX is a registered trademark of the Open Group in the United States and other countries), Windows® (Registered Trademark of Microsoft Corporation), Linux® (Registered trademark of Linus Torvalds), Solaris® (Registered trademark of Sun Microsystems Inc.) and HP-UX® (Registered trademark of Hewlett-Packard Development Company, L.P.).

In various embodiments, the database server 232 is the IBM Informix Dynamic Server. However, the invention is not meant to be limited to the IBM Informix Dynamic Server and may be used with other database management systems.

In various embodiments, the present invention may be implemented as a method, system, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 5 is not intended to limit the present invention. Other alternative hardware environments may be used without departing from the scope of the present invention.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-readable storage medium embodying computer usable program code for maintaining an order of transactions replicated from a source database to a target database, comprising:
    computer usable program code for receiving, from said source database, a first transaction and a second transaction, wherein said first transaction was committed prior to said second transaction at said source database;
    computer usable program code for processing said first transaction using a first thread, wherein a first lockable object is locked once processing of said first transaction begins, and said first lockable object is unlocked once said first transaction is committed;
    computer usable program code for, prior to committing said second transaction at said target database, determining whether said first thread has committed said first transaction, based on whether a lock on said first lockable object can be obtained and further based on whether a shared lock on said first lockable object can be obtained;
    computer usable program code for, in response to determining that said first thread has not committed said first transaction, serially processing said first transaction and said second transaction using said first thread, whereby said second transaction is committed after said first transaction at said target database; and
    computer usable program code for, in response to determining that said first thread has committed said first transaction, processing said second transaction using a second thread that is distinct from said first thread.

2. The computer-readable storage medium of claim 1 further comprising
computer usable program code for exclusively locking, at said target database, said first lockable object prior to said attempting to obtain said shared lock.

3. The computer-readable storage medium of claim 1 wherein said first lockable object is a pseudo-row.

4. The computer-readable storage medium of claim 1 wherein said first lockable object is a row of a table.

5. The computer-readable storage medium of claim 1 wherein said first transaction is associated with a post-commit trigger request.

6. The computer-readable storage medium of claim 1 further comprising:
computer usable program code for exclusive locking, at said target database, said first lockable object;
computer usable program code for, after said exclusive locking, processing said first transaction at said target database;
computer usable program code for processing said second transaction at said target database, wherein said first and second transactions are processed in parallel; and
computer usable program code for rolling back said second transaction, and serially processing said first transaction, wherein said first and second transactions are not processed in parallel.

7. The computer-readable storage medium of claim 1 further comprising:
computer usable program code for updating a commit progress table to indicate a last transaction which was committed on said target database.

8. The computer-readable storage medium of claim 6 wherein said computer usable program code for serially processing said first transaction and said second transaction using said first thread further comprises:
committing said first transaction, wherein said first lockable object is unlocked in response to said committing;
after said committing said first transaction, processing said second transaction; and
committing said second transaction.

9. The computer-readable storage medium of claim 1 wherein said being unable to obtain said lock causes a deadlock to be detected at said target database, and wherein said computer usable program code for serially processing said first transaction and said second transaction using said first thread is executed in response to said deadlock.

10. A computer system to maintain an order of transactions replicated from a source database to a target database, comprising:
a processor; and
a memory storing instructions executable by said processor that cause said processor to:
receive, from said source database, a first transaction and a second transaction, wherein said first transaction was committed prior to said second transaction at said source database;
process said first transaction using a first thread, wherein a first lockable object is locked once processing of said first transaction begins, and said first lockable object is unlocked once said first transaction is committed;
prior to committing said second transaction at said target database, determining whether said first thread has committed said first transaction, based on whether a lock on said first lockable object can be obtained and further based on whether a shared lock on said first lockable object can be obtained;
in response to determining that said first thread has not been committed said first transaction, serially processing said first transaction and said second transaction using said first thread, whereby said second transaction is committed after said first transaction at said target database; and
in response to determining that said first thread has committed said first transaction, processing said second transaction using a second thread that is distinct from said first thread.

11. The computer system of claim 10 wherein said first lockable object is a row of a table.

12. The computer system of claim 10 wherein said first lockable object is a pseudo-row.

13. The computer system of claim 10 wherein said first transaction is associated with a post-commit trigger request.

14. The computer system of claim 11 wherein said instructions stored in said memory further cause said processor to:
update a commit progress table to indicate a last transaction which was committed on said target database.

\* \* \* \* \*